(12) United States Patent
Vivanco

(10) Patent No.: US 9,438,406 B1
(45) Date of Patent: Sep. 6, 2016

(54) METHODS AND SYSTEMS FOR IMPLEMENTING AN INTER-FREQUENCY MEASUREMENT PROCEDURE IN THE PRESENCE OF A CLOSED ACCESS NODE

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 36 days.

(21) Appl. No.: 14/481,150

(22) Filed: Sep. 9, 2014

(51) Int. Cl.
*H04L 5/00* (2006.01)
*H04W 28/02* (2009.01)
*H04W 40/12* (2009.01)
*H04W 24/10* (2009.01)
*H04W 28/04* (2009.01)
*H04L 25/03* (2006.01)

(52) U.S. Cl.
CPC ............ *H04L 5/0069* (2013.01); *H04W 24/10* (2013.01); *H04W 28/0236* (2013.01); *H04W 40/12* (2013.01); *H04L 25/03821* (2013.01); *H04W 28/048* (2013.01)

(58) Field of Classification Search
CPC ......... H04W 28/0236; H04W 28/048; H04W 40/12; H04W 40/16; H04W 72/04; H04W 72/082; H04L 5/0069; H04L 5/0073; H04L 25/03821
See application file for complete search history.

(56) References Cited

U.S. PATENT DOCUMENTS

| 2009/0285171 A1* | 11/2009 | Claussen | ............... | H04W 16/18 370/329 |
| 2012/0295546 A1* | 11/2012 | Fujito | ............... | H04W 72/0426 455/63.1 |
| 2013/0035100 A1* | 2/2013 | Murakami | ............ | H04W 92/20 455/436 |
| 2013/0065594 A1 | 3/2013 | Somasundaram et al. | | |
| 2014/0066074 A1* | 3/2014 | Folke | ..................... | H04W 36/08 455/437 |
| 2014/0228057 A1* | 8/2014 | Uga | ....................... | H04W 64/00 455/456.3 |
| 2014/0355501 A1* | 12/2014 | Carmon | ................. | H04W 36/16 370/311 |
| 2015/0024762 A1* | 1/2015 | Cho | ...................... | H04W 24/02 455/450 |
| 2015/0078161 A1* | 3/2015 | Elsherif | ................ | H04W 16/04 370/235 |
| 2015/0327134 A1* | 11/2015 | Xu | ..................... | H04W 36/0083 455/437 |

FOREIGN PATENT DOCUMENTS

| WO | 2013/064591 A1 | 5/2013 |
| WO | 2013/104129 A1 | 7/2013 |

\* cited by examiner

Primary Examiner — Redentor Pasia

(57) ABSTRACT

Systems and methods are described for implementing an inter-frequency measurement procedure in a wireless communication network. A group of wireless devices are selected based on a selection criteria. A first parameter value associated with a first access node is received from the selected group of wireless devices at the first access node. Proximity of a second access node to the first access node is estimated based on the received first parameter value. A second parameter value that is similar to the first parameter value and associated with the first access node is received from a non-selected wireless device. Quality indicators for the non-selected wireless device are monitored at the first access node. A relationship between the received first parameter value and the quality indicators for the non-selected wireless device is determined. An inter-frequency measurement procedure based on the determined relationship is initiated.

18 Claims, 6 Drawing Sheets

METHODS AND SYSTEMS FOR IMPLEMENTING AN INTER-FREQUENCY MEASUREMENT PROCEDURE IN THE PRESENCE OF A CLOSED ACCESS NODE

TECHNICAL BACKGROUND

Telecommunication systems, such as cellular networks or other wireless networks, use wireless signals to establish communication channels between various network devices. For example, an access node may transmit a reference signal or a pilot signal over a signal radius, and one or more wireless devices within the signal radius may attempt to establish a connection with the access node. In a heterogeneous network, a handover procedure for offloading traffic at hotspot areas can be negotiated between a source access node (e.g., strongest signal strength) and a target access node (e.g., short range, low power access node). This allows a wireless device to be served by an access node having the lowest signal path loss rather than by an access node having the strongest signal strength.

In some instances, a wireless device connected to a source access node moves into a coverage area of a target access node, that operates in the same frequency band as and is deployed in proximity to the source access node, that the wireless device is not allowed to connect to. The wireless device may suffer intra-frequency interference from the target access node. This interference can result in an undesirable reduction in coverage, poor quality of service, throughput to the wireless device, and handover failure.

OVERVIEW

Systems and methods are described for implementing an inter-frequency measurement procedure in a communication network. In one instance, a plurality of active wireless devices in communication with a first access node may be detected. The first access node may select a group of wireless devices based on a selection criteria. A first parameter value associated with the first access node may be received from the selected group of wireless devices. The proximity of a second access node to the first access node may be estimated based on the received first parameter value. A second parameter value associated with the first access node that is similar to the first parameter value may be received from a non-selected wireless device. Quality indicators for the non-selected wireless device may be monitored at the first access node. A relationship between the received first parameter value and the quality indicators may be determined. An inter-frequency measurement procedure based on the determined relationship may be initiated. The non-selected wireless device may then be instructed to communicate with the first access node on a different frequency band.

DETAILED DESCRIPTION

Figure 1:
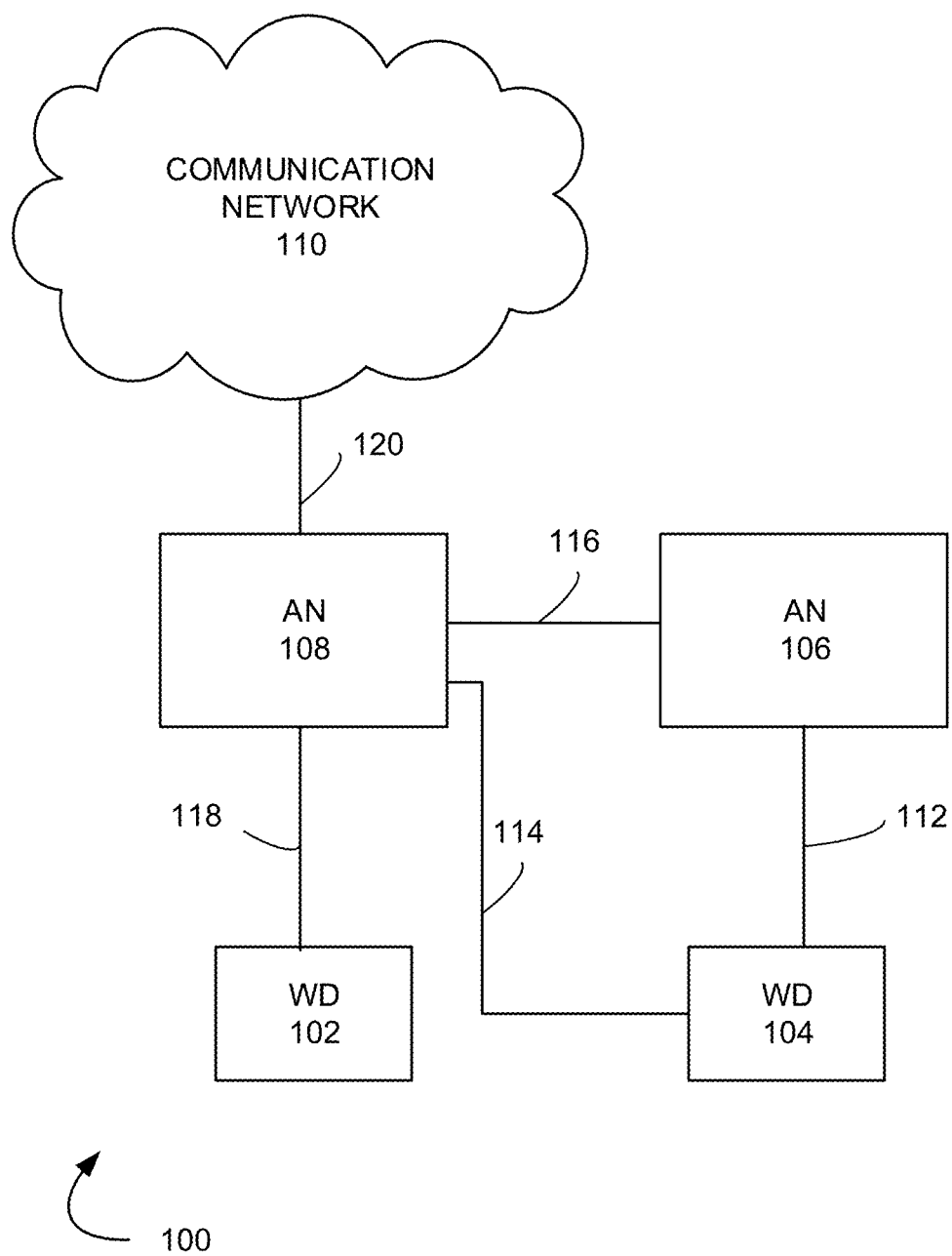
FIG. 1 illustrates an exemplary communication system for implementing an inter-frequency measurement procedure in a wireless communication network.

FIG. 1 illustrates an exemplary communication system 100 for implementing an inter-frequency measurement procedure in a wireless communication network. Communication system 100 can comprise wireless device 102, 104, access nodes 106, 108, and communication network 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106, 108, and communication network 110 which are omitted for clarity, including additional processing nodes, routers, gateways, and physical and/or wireless data links for carrying data among the various network elements.

Wireless devices 102, 104 can be any device configured to communicate over system 100 using a wireless communication link. For example, wireless devices 102, 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access nodes 106, 108, any number of wireless devices can be implemented according to various exemplary embodiments disclosed herein.

Wireless devices 102, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 106, 108 can be any network node configured to provide communication between wireless devices 102, 104 and communication network 110. Access nodes 106, 108 can be short range access nodes or standard access nodes. A short range access node could include a microcell base station, a picocell base station, a femtocell base station, or the like and a standard access node could include a base transceiver station, a radio base station, an NodeB device, or an enhanced eNodeB device, or the like. It is noted that while two access nodes 106, 108 are illustrated in FIG. 1, any number of access nodes can be implemented within system 100.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying data, for example, to support voice, push-to-talk, broadcast video, and data communications by a wireless device such as wireless devices 102, 104. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

Communication links 112, 114, 116, 118, 120 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114, 116, 118, 120 can be a direct link or might include various equipment, intermediate components, systems, and networks.

Figure 2:
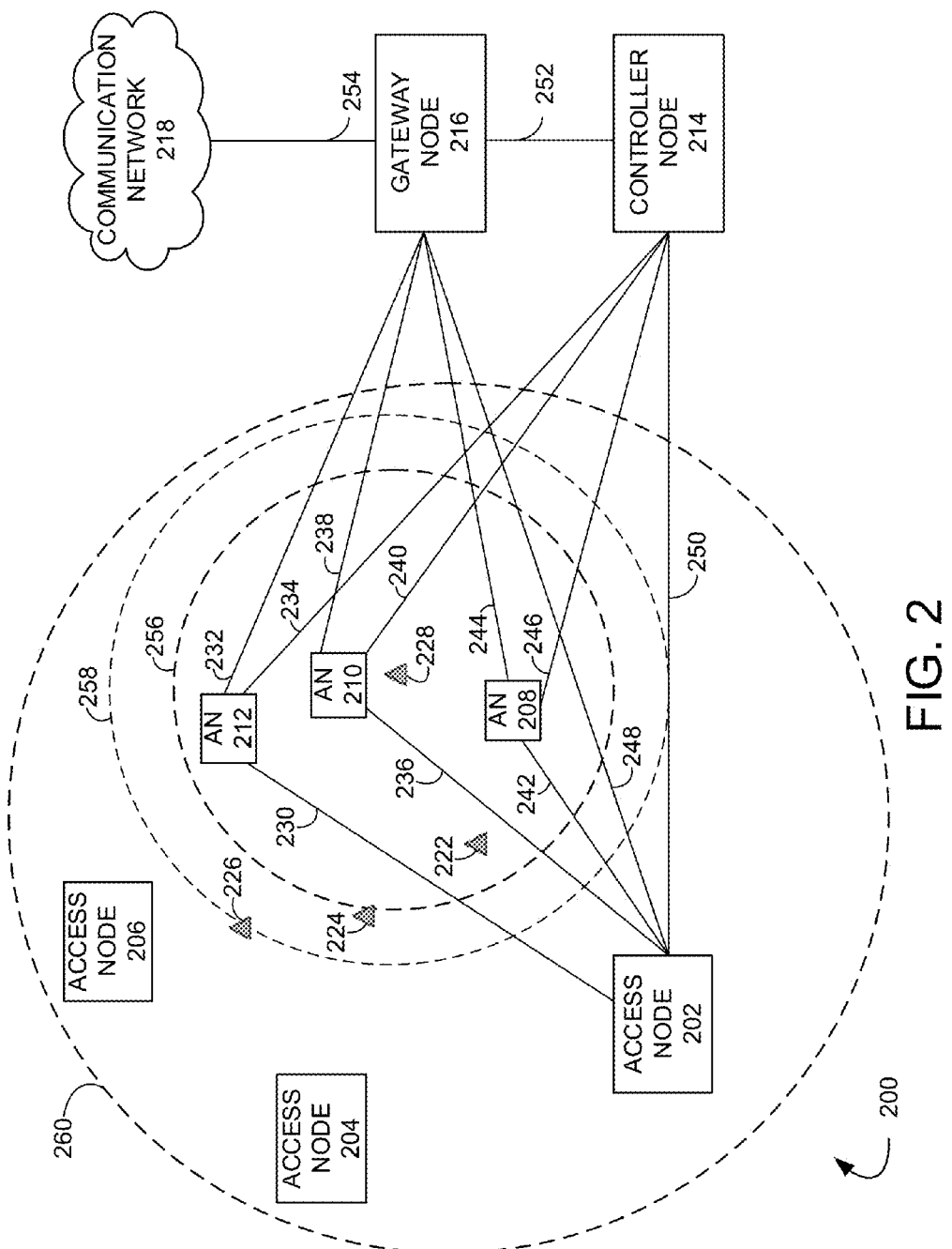
FIG. 2 illustrates another exemplary system for implementing an inter-frequency measurement procedure in a wireless communication network.

FIG. 2 illustrates an exemplary system for implementing an inter-frequency measurement procedure in a wireless communication network. Communication system 200 can comprise wireless devices 222, 224, 226, 228, access nodes 202, 204, 206, 208, 210, 212, controller node 214, gateway node 216, and communication network 218. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 202, 204, 206, 208, 210, 212 and communication network 218, which are omitted for clarity, including additional processing nodes, routers, gateways, and physical and/or wireless data links for carrying data among the various network elements.

Wireless devices 222, 224, 226, 228 can be any device configured to communicate over communication system 200 using a wireless interface. For example, wireless devices 222, 224, 226, 228 can include a remote terminal unit, a cell phone, a smart phone, a computing platform such as a laptop, palmtop, or a tablet, a personal digital assistant, or an internet access device, and combinations thereof.

The wireless interface of wireless devices 222, 224, 226, 228 can include one or more transceivers for transmitting and receiving data over communication system 200. Each transceiver can be associated with the same or different frequency bands, the same or different radio access technologies, the same or different network providers, and/or the same or different services. For example, wireless devices 222, 224, 226, 228 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIG. 2 for clarity, wireless device 222, 224, 226, 228 can be in communication with access node 202, 204, 206, 208, 210, 212. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 222 and access node 208 could share the same representative wireless link, but be transferred over different communication sessions, frequencies, timeslots, packets, ports, sockets, logical transport links, or in different directions—including combinations thereof.

Wireless devices 222, 224, 226, 228 can transmit and/or receive information over communication system 200 using various communication services. These services can include various voice, data, and/or MBMS services and applications. For example, mobile voice services, mobile data services, push-to-talk services, internet services web browsing, email, pictures, picture messaging, video, video messaging, broadcast video, audio, voicemail, music, MP3's, ring tones, stock tickers, new alerts, etc.

Access nodes 202, 204, 206, 208, 210, 212 can be any network node configured to provide communication between wireless devices 222, 224, 226, 228 and communication network 218. Access nodes 202, 204, 206, 208, 210, 212 can be standard access nodes or short range, low power access nodes. In an exemplary embodiment, access nodes 202, 204, 206 can be a standard access node having a coverage area 260. Access nodes 208, 210, 212 can be short range, low power access node having a coverage area 256. Access nodes 208, 210, 212 can be within at least a portion of an overlapping coverage area of access nodes 202, 204, 206 where each access node 208, 210, 212 has a coverage area that includes a cell edge portion.

A standard access node can be a macrocell access node such as a base transceiver station, a radio base station, an eNodeB device, or an enhanced eNodeB device, or the like. A short range access node can include a microcell base station, a picocell base station, a femtocell base station, or the like such as a home NodeB or a home eNodeB device. In addition, a wireless device configured to enter a hotspot mode can be a femtocell access node. It is noted that while six access nodes 202, 204, 206, 208, 210, 212 are illustrated in FIG. 2, any number of access nodes can be implemented within system 200.

Access nodes 202, 204, 206, 208, 210, 212 can comprise a processor and associated circuitry to execute or direct the execution of computer-readable instructions to obtain information. Access nodes 202, 204, 206, 208, 210, 212 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 202, 204, 206, 208, 210, 212 can receive instructions and other input at a user interface.

Gateway node 216 can be any network node configured to interface with other network nodes using various protocols that communicates, routes, and forwards communication data addressed to a wireless device 222, 224, 226, 228. In addition, gateway node 216 can act as a mobility anchor for wireless devices 222, 224, 226, 228 during handovers between different frequencies and/or different radio access technologies supported by the same access node. Gateway node 216 can be a standalone computing device, computing system, or network component, and can be accessible, for example, by a wired or wireless connection, or through an indirect connection such as through a computer network or communication network. For example, gateway node 216 can include a serving gateway (SGW) and/or public data network gateway (PGW), etc. One of ordinary skill in the art would recognize that gateway node 216 is not limited to any specific technology architecture, such as Long Term Evolution (LTE) and can be used with any network architecture and/or protocol.

Gateway node 216 can comprise a processor and associated circuitry to execute or direct the execution of computer-readable instructions to obtain information. Gateway node 216 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 216 can receive instructions and other input at a user interface.

Controller node 214 can be any network node configured to communicate information and/or control information over communication system 200. Controller node 214 can be configured to transmit control information associated with a handover procedure. Controller node 214 can be a standalone computing device, computing system, or network component, and can be accessible, for example, by a wired or wireless connection, or through an indirect connection such as through a computer network or communication network. For example, controller node 214 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 214 is not limited to any specific technology architecture, such as Long Term Evolution (LTE) and can be used with any network architecture and/or protocol.

Controller node 214 can comprise a processor and associated circuitry to execute or direct the execution of computer-readable instructions to obtain information. Controller node 214 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 214 can receive instructions and other input at a user interface.

Access node 202 can be in communication with access node 212 through communication link 230. Access node 212 can be in communication with gateway node 216 through communication link 232. Access node 212 can be in communication with controller node 214 through communication link 234. Access node 202 can be in communication with access node 210 through communication link 236. Access node 210 can be in communication with gateway node 216 through communication link 238. Access node 210 can be in communication with controller node 214 through communication link 240. Access node 202 can be in communication with access node 208 through communication link 242. Access node 208 can be in communication with gateway node 216 through communication link 244. Access node 208 can be in communication with controller node 214 through communication link 246. Access node 202 can be in communication with gateway node 216 through communication link 248 and in communication with controller node 214 through communication link 250. Gateway node 216 can be in communication with controller node 214 through communication link 252. Gateway node 216 can be in communication with communication network 218 through communication link 254. Access nodes 202, 204, 206 can be in communication with access nodes 208, 210, 212, controller node 214, and gateway node 216 through communication links (not shown).

Communication links 230, 232, 234, 236, 238, 240, 242, 244, 246, 248, 250, 252, 254 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 230, 232, 234, 236, 238, 240, 242, 244, 246, 248, 250, 252, 254 can be a direct link or might include various equipment, intermediate components, systems, and networks.

Communication network 218 can be a wired and/or wireless communication network, and can comprise processing nodes, routers, gateways, and physical and/or wireless data links for carrying data among various network elements, including combinations thereof, an can include a local area network, a wide area network, and an internetwork (including the Internet). Communication network 218 can be capable of carrying data, for example, to support voice, push-to-talk, broadcast video, and data communications by a wireless device, for example, wireless device 222. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 218 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 218 can also comprise additional base stations, controller nodes, telephony switches, internet routers, network gateways, computer systems, communication links, or some other type of communication equipment, and combinations thereof.

Intra-frequency handover between two access nodes 202, 208 can occur when a wireless device 222 meets a handover condition threshold. The handover condition threshold can be, for example, loading at a source access node 202 or proximity to a target access node 208. When the handover condition meets the threshold, the wireless device 222 can transmit measurement and reporting information to the source access node 202 indicating proximity to a target access node 208.

In an exemplary embodiment, the wireless device 222 has a subscription to the target access node 208, e.g., the target access node 208 has a Closed Subscriber Group Identity (CSG-ID) that corresponds to a CSG-ID stored in a CSG whitelist of the wireless device 222. The wireless device 222 may use CSG-ID information broadcasted by target access node 208 for access node re-selection and handover purposes.

Specifically, the wireless device 222 may use CSG Proximity Estimation to determine proximity to the target access node 208. Once the wireless device 222 has determined it is near the target access node 208, it may provide a CSG Proximity Indication message to the communication network 218 and source access node 202. Based on the received CSG Proximity Indication message, the communication network 218 can determine a criteria for selecting a wireless device 222 and may choose the target access node 208 for handover of the selected wireless device 222. The source access node 202 may configure the selected wireless device 222 to perform specific CSG measurements and reporting, e.g., Report Proximity Configuration via an RRC Connection Reconfiguration message, for the target access node 208. The source access node 202 may handover the selected wireless device 222 to the target access node 208 and remove the Report Proximity Configuration via an RRC Connection Reconfiguration message for the selected wireless device 222 subscribed to the target access node 208.

In operation, the process of providing and removing the Report Proximity Configuration via an RRC Connection Reconfiguration messages to/from a plurality of selected wireless devices 222 in proximity to a target access nodes 208 results in battery resource and network signaling overhead. This may result in high intra-frequency interference of non-selected wireless devices 228 that are located within the coverage area 256 of the target access node 208 and that are connected to the source access node 202. Consequently, the usage experience of the non-selected wireless devices 228 may deteriorate.

Inter-frequency handover provides the communication network with the opportunity to reduce intra-frequency interference of the non-selected wireless devices 228. This can be accomplished by providing internet access to the non-selected wireless devices 228 through multiple frequency bands.

Figure 3:
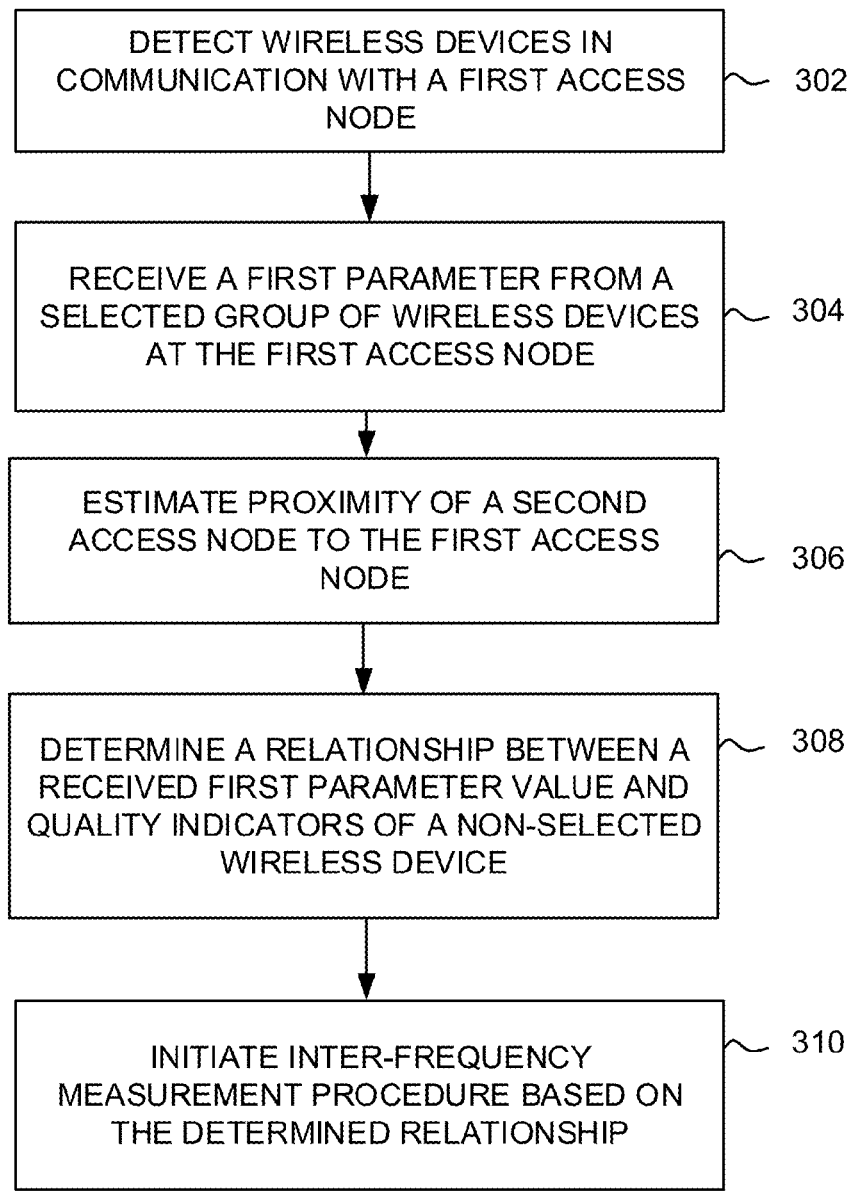
FIG. 3 illustrates an exemplary method for implementing an inter-frequency measurement procedure in a communication network.

FIG. 3 illustrates a flow chart of an exemplary method for implementing an inter-frequency measurement procedure in a wireless communication network. The method will be discussed with reference to the exemplary communication system 200 illustrated in FIG. 2. However, the method can be implemented in the exemplary communication system 100 illustrated in FIG. 1, and with any suitable communication system. In addition, although FIG. 3 depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 3, at step 302, a network node can detect a plurality of active wireless devices in communication with a first access node. For example, when a wireless device 222 initially establishes communication with a source access node 202 (i.e., upon initialization or during an intra-frequency handover procedure), a request to establish a first communication link between the source access node 202 and gateway node 216 can be transmitted to the controller node 214. After the first communication link is established, data addressed to the wireless device 222 can be communicated from the controller node 214 to the wireless device 222 over the first communication link via source access node 202.

At step 304, a source access node can receive measurement and reporting information from a wireless device indicating proximity to a target access node. For example, a target access node 208 can be deployed within a coverage area 260 of a source access node 202. The source access node 202 can enable a Report Proximity Configuration via an RRC Connection Reconfiguration message and configure a wireless device 222 to perform specific measurement and reporting. The wireless device 222 can send a Proximity Indication message to the source access node 202 informing the source access node 202 that it is nearby a target access node 208 whose CSG-ID corresponds to an identity stored on a CSG whitelist of the wireless device 222, e.g., selected wireless device. The process of providing/removing relevant CSG measurement configurations and the large number of selected wireless devices 222, 224, 226 sending Proximity Indication messages to the source access node 202 creates wireless device and signaling overhead. This may deteriorate the usage experience of a non-selected wireless device 228, e.g., a wireless device that is not allowed to connect to the target access node 208, and the non-selected wireless device 228 may suffer high intra-frequency interference.

In an exemplary embodiment, a network may be placed in the communication network 218 to monitor the Proximity Indication messages received from the selected wireless devices 222 having a valid CSG subscription. The network can pull the valid CSG subscription information of the selected wireless devices 222 from the controller node 214. The controller node 214 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc.

At step 306, a network node can estimate proximity of a target access node to a source access node based on received measurement and reporting information. For example, in an exemplary embodiment, a network can collect a Reference Signal Received Power ($RSRP_{Macro-j}$) from a source access node 202 and a Reference Signal Received Power ($RSRP_{CSG-Cell-i}$) from a target access node 208 that a selected wireless device 222 reports when sending an "entering/leaving CSG" Proximity Indication message to the source access node 202. When the selected wireless device 222 reports an "entering CSG" Proximity Indication message to the source access node 202, the controller node 214 may store corresponding $RSRP_{Macro-j}$ and $RSRP_{CSG-Cell-i}$ levels of the source 202 and target 208 access nodes and a EUTRAN Global Cell Identifier ($EGCI_{source}$) of the source access node 202 in the communication network 218. When the selected wireless device 222 reports a "leaving CSG" Proximity Indication message to the source access node 202, the controller node 214 may store corresponding $RSRP_{Macro-j}$ and $RSRP_{CSG-Cell-i}$ levels of the source 202 and target 208 access nodes and a EUTRAN Global Cell Identifier ($EGCI_{target}$) of the target access node 208 in the communication network 218. The network can estimate the proximity of the target access node 208 to the source access node 202 based on the received $RSRP_{Macro-j}$ and $RSRP_{CSG-Cell-i}$ levels.

The network can also collect $RSRP_{Macro-j}$ level that a non-selected wireless device 228 reports of its current frequency when the non-selected wireless device 228 is in an RCC Connected mode. When the non-selected wireless device 228 reports a $RSRP_{Macro-j}$ level that is similar to an $RSRP_{Macro-j}$ and $RSRP_{CSG-Cell-i}$ level reported by the selected wireless devices 222 the network will periodically monitor quality indicators for the non-selected wireless device 228. The quality indicators can include, for example, information regarding throughput and latency, Reference Signal Received Quality (RSRQ), a number of target access nodes 208 scanned, and the number of Hybrid Automatic Repeat Request (HARD) received per minute for the non-selected wireless device 228.

At step 308, a relationship between the received Proximity Indication messages reported by the selected wireless devices and the monitored quality indicators of the non-selected wireless device may be determined. For example, the $RSRP_{Macro-j}$ and $RSRP_{CSG-Cell-i}$ levels of the source 202 and target 208 access nodes and the $EGCI_{source}$ and $EGCI_{target}$ information reported by the selected and non-selected wireless devices 222, 228 may be used to estimate an impact of intra-frequency interference, at specific locations, on the non-selected wireless device 228.

In an exemplary embodiment, the non-selected wireless device 228 reports an $RSRP_{Macro-j}$ level that is similar to an $RSRP_{Macro-j}$ and/or $RSRP_{CSG-Cell-i}$ level reported by the selected wireless devices 222. The network monitors and collects quality indicators from the non-selected wireless device 228 and correlates the collected quality indicators against the stored $RSRP_{Macro-j}$ and $RSRP_{CSG-Cell-i}$ levels reported by the selected wireless devices 222. The impact of the target node 208 inter-frequency interference on the non-selected wireless device 228 may be measured by determining a change in the quality indicators of the non-selected wireless device 228 as a function of the $RSRP_{Macro-j}$ and $RSRP_{CSG-Cell-i}$ levels reported by the selected wireless devices 222.

Note that it is assumed that the $RSRP_{Macro-j}$ and $RSRP_{CSG-Cell-i}$ levels reported by the selected wireless devices 222 becomes weaker as the non-selected wireless device 228 moves further into a coverage area 256 of the target access node 202. Large target node 208 Intra-frequency interference can be identified by an abrupt drop in the quality indicators of the non-selected wireless device 228.

At step 310, a network node can initiate an inter-frequency measurement procedure based on the determined relationship. For example, the network can estimate the impact of the target node 208 intra-frequency interference, at specific locations, for the non-selected wireless device 228 connected to the source access node 202. The network can use the estimated impact to adjust an inter-frequency measurement report for the non-selected wireless device 228 and instruct the non-selected wireless device 228 to operate on a different frequency band. The source access node 202 can proceed with handover of the non-selected wireless device 228.

In an exemplary embodiment, once handover of the non-selected wireless device 228 is completed, the network can monitor handover performance for the non-selected wireless device 228 via the controller node 214.

One skilled in the art, using the disclosure provided herein, will appreciate that various steps of the methods can be omitted, rearranged, combined and/or adapted in various ways and can be completed by multiple wireless devices and access nodes, for example between wireless devices 222, 224, 226, 228 and access node 204, 206, 210, 212.

Figure 4:
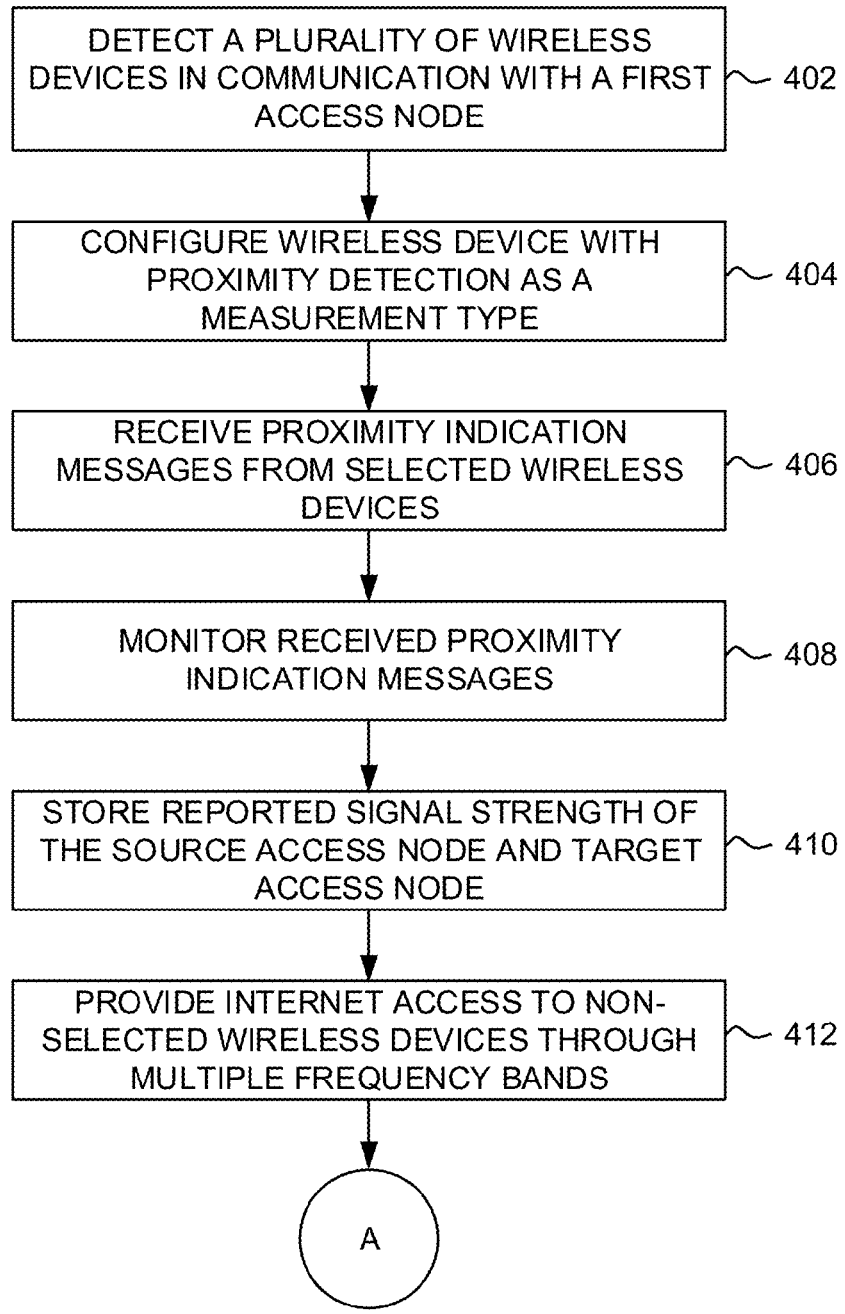
FIG. 4 illustrates another exemplary method for implementing an inter-frequency measurement procedure in a communication network.

FIG. 4 illustrates an exemplary method for implementing an inter-frequency measurement procedure in a communication network. The method will be discussed with reference to the exemplary communication system for implementing an inter-frequency measurement procedure in a communication network illustrated in FIG. 2. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 4, at step 402, a plurality of active wireless devices in communication with a source access node are detected. For example, in an exemplary embodiment, when a wireless device 222, 224, 226, 228 initially establishes communication with a source access node 202 (i.e., upon initialization or during an intra-frequency handover procedure), a request to establish a first communication link between the source access node 202 and gateway node 216 can be transmitted to controller node 214. After the first communication link is established, data addressed to the wireless device 222, 224, 226, 228 can be communicated from the controller node 214 to the wireless device 222, 224, 226, 228 over the first communication link via the source access node 202.

In another exemplary embodiment, multiple access nodes may be individually identified by a unique CSG-ID. For example, a target access node 208, 210, 212 may have a CSG-ID associated with an identity stored on a CSG whitelist of a selected wireless device 222, 224, 226, e.g., valid CSG subscription. The target access node 208, 210, 212 can broadcast its CSG-ID in system information. The broadcasted CSG-ID of the target access node 208, 210, 212 can be used by the selected wireless device 222, 224, 226 for access node re-selection and handover purposes.

At step 404, a source access node can configure a wireless device with a measurement type. For example, controller node 214 can initiate CSG Proximity Estimation reporting by the wireless device 222, 224, 226 by configuring a wireless device 222, 224, 226 to determine, based on wireless device implementation, e.g., Global Positioning System, that it is near a target access node 208, 210, 212 whose CSG-ID is stored in a CSG whitelist of the wireless device 222, 224, 226, e.g., selected wireless device.

In an exemplary embodiment, the target access node 208, 210, 212 can be deployed within a coverage area 260 of the source access node 202, 204, 206 and the source access node 202, 204, 206 can enable a Report Proximity Configuration via an RRC Connection Reconfiguration message. The source access node 202, 204, 206 can configure the wireless device 222, 224, 226 to perform specific measurement and reporting. A selected wireless device 222, 224, 226 with a valid CSG Subscription to the target access node 208, 210, 212 can send a Proximity Indication message to the source access node 202, 204, 206. The Proximity Indication message informs the source access node 202, 204, 206 that the selected wireless device 222, 224, 226 is near the target access node 208, 210, 212.

In another exemplary embodiment, a non-selected wireless device 228 does not have a valid CSG Subscription to the target access node 208, 210, 212 and does not support CSG Proximity Estimation and is unaware that it is entering a coverage area 256 of the target access node 208, 210, 212.

At step 406, a source access node receives a Proximity Indication message from a wireless device. For example, a selected wireless device 222, 224, 226 can provide the source access node 202, 204, 206 with a Proximity Indication message indicating proximity of the selected wireless device 222, 224, 226 to a target access node 208, 210, 212 whose CSG-ID is in the CSG whitelist of the selected wireless device 222, 224, 226. The Proximity Indication message can include information of whether the selected wireless device 222, 224, 226 is entering or leaving a corresponding frequency associated with the source access node 202, 204, 206 and/or the target access node 208, 210, 212.

At step 408, a network monitors received Proximity Indication messages reported by a wireless device. For example, a network can be placed in the communication network 218. The network can monitor the Proximity Indication messages received from the selected wireless device 222, 224, 226 at the source access node 202, 204, 206 that correspond to the target access node 208, 210, 212. The network can pull the CSG-ID subscription information of the selected wireless device 222, 224, 226 for the source access node 202, 204, 206 from the controller node 214. The network can monitor the CSG-ID subscription information of the connected wireless devices 222, 224, 226, 228 at the source access node 202, 204, 206. The controller node 214 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc.

At step 410, a network can collect Reference Signal Received Power from the source access node and the target access node. For Example, a network can be placed in the communication network 218. The network can collect a Reference Signal Received Power (RSRP$_{Macro-j}$) of a source access node 202, 204, 206 and a Reference Signal Received Power (RSRP$_{CSG-Cell-i}$) of a target access node 208, 210, 212 reported by a selected wireless device 222, 224, 226 when sending the Proximity Indication message to the source access node 202, 204, 206.

When the target access node 208, 210, 212 and the source access node 202, 204, 206 operate on the same frequency band and are deployed in proximity to each other, e.g., within the same coverage area 260, intra-frequency interference may occur. Specifically, the RSRP$_{Macro-j}$ of the source access node 202, 204, 206 and the RSRP$_{CSG-Cell-i}$ of the target access node 208, 210, 212 reported by selected wireless devices 222, 224, 226 when sending a Proximity Indication message to the source access node 202, 204, 206 may create interference for a non-selected wireless device 228 that is not allowed to connect to the target access node 208, 210, 212. This may deteriorate the usage experience of the non-selected wireless device 228.

At step 412, a source access node can provide internet access to a non-selected wireless device through multiple frequency bands, e.g., 800 Megahertz, 1.9 Gigahertz, 2.5 Gigahertz, etc. For example, a network can collect and measure RSRP$_{Macro-j}$ and RSRP$_{CSG-Cell-i}$ reported by selected and non-selected wireless devices 222, 224, 226, 228 to the source access node 202, 204, 206 when the wireless devices 222, 224, 226, 228 are in an RRC Connection mode.

In an exemplary embodiment, inter-frequency measurement and reporting may be triggered when the RSRP$_{Macro-j}$ and RSRP$_{CSG-Cell-i}$ reported by selected and non-selected wireless devices 222, 224, 226, 228 at a given frequency, for example, 800 Megahertz, drops below a predefined threshold (T) that may be set by wireless operators independent from a network topology and eNodeB types. This indicates that the wireless device 222, 224, 226, 228 is moving out of a coverage area 256, 260 of the target access node 208, 210, 212 and/or source access node 202, 204, 206. When the RSRP$_{Macro-j}$ and RSRP$_{CSG-Cell-i}$ drops below the predefined threshold T, the source access node 202, 204, 206 may instruct the non-selected wireless device 228 to perform inter-frequency and/or inter-RAT measurements. For example, the source access node 202, 204, 206 may send a measurement configuration that includes a measurement gap pattern sequence to the non-selected wireless device 228. The measurement gap patterns may contain gaps every N number of frames, e.g., the measurement gap patterns may be a multiple of 10 milliseconds, and may have a measurement gap length (MGL) of 6 milliseconds duration. In some instances, a single measurement gap pattern may be used to monitor all possible inter-frequency and/or inter-RAT measurements, for example, inter-frequency LTE Frequency Division Duplex (FDD) which require separate frequency bands or channels, inter-frequency LTE Time Division Duplex (TDD) which uses a single frequency band to transmit and receive station data over a given period of time, Universal Mobile Telecommunication System (UMTS), etc. In LTE standards, two gap patterns, 0 and 1, are defined. The gap length of the gap patterns defined in LTE standards may be 6 milliseconds and may use two different measurement gap repetition rates (MPRG) of 40 milliseconds or 80 milliseconds. Measurement reports collected at the source access node 202, 204, 206 during the measurement gaps are transmitted to the non-selected wireless device 228. The non-selected wireless device 228 may initiate an inter-frequency or Inter-Radio Access Technology (IRAT) handover procedure based on the received measurement reports.

Note that during the measurement gaps, the non-selected wireless device reception and transmission activities with the source access node 202, 204, 206 are interrupted. Different gap periodicities may be used to trade-off between a non-selected wireless device 228 inter-frequency and IRAT measurement performance, non-selected wireless device 228 data throughput, and efficient utilization of transmission resources by the non-selected wireless device 228. As a measurement gap density increase, measurement performance improves. However, as noted above, the measurement performance improves at the cost of the non-selected wireless device 228, e.g., reception and transmission activities with the source access node 202, 204, 206 are interrupted.

Figure 5:
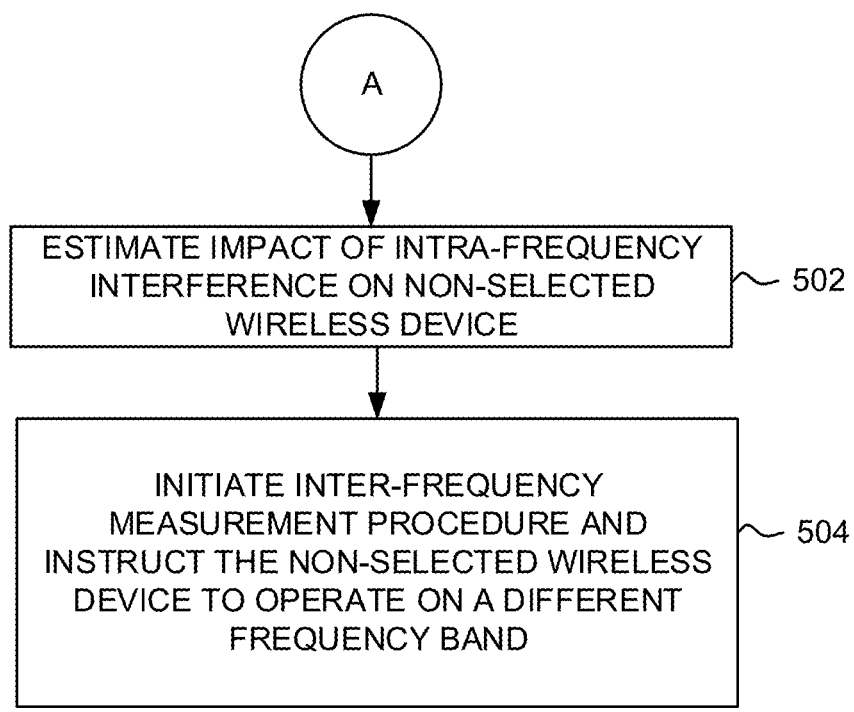
FIG. 5 illustrates another exemplary method for implementing an inter-frequency measurement procedure in a communication network.

FIG. 5 illustrates an exemplary method for implementing an inter-frequency measurement procedure in a communication network. The method of FIG. 5 may follow the method of FIG. 4. The method will be discussed with reference to the exemplary communication system for implementing an inter-frequency measurement procedure in a communication network illustrated in FIG. 2. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 5, at step 502, a network node can estimate an impact of target access node 208, 210, 212 intra-frequency interference on non-selected wireless devices connected to the source access node at specific locations. For example, a non-selected wireless device 228 may fail to trigger an inter-frequency measurement report if the $RSRP_{Macro-j}$ of the serving frequency, for example, 800 Megahertz, is above the predefined threshold T. Consequently, the source access node 202, 204, 206 may not handover the non-selected wireless device 228 to available frequencies that do not receive interference from the $RSRP_{CSG-Cell-i}$ of the target access node 208, 210, 212 and that are supported by the source access node 202, 204, 206 and the non-selected wireless device 228 may not be aware that it is entering a coverage area 256 of the target access node 208, 210, 212 since it does not support CSG Proximity Indication messaging.

In an exemplary embodiment, the network collects the $RSRP_{Macro-j}$ from the source access node 202, 204, 206 and the $RSRP_{CSG-Cell-i}$ from the target access node 208, 210, 212 that the selected wireless devices 222, 224, 226 report when sending an "entering/leaving CSG" Proximity Indication message to the source access node 202, 204, 206. When the selected wireless devices 222, 224, 226 report an "entering CSG" Proximity Indication message to the source access nod 202, 204, 206, the controller node 214 may store a corresponding $RSRP_{Macro-j}$ and $RSRP_{CSG-Cell-i}$ level of the source 202, 204, 206 and target 208, 210, 212 access nodes and a $EGCI_{source}$ of the source access node 202, 204, 206 in the communication network 218. When the selected wireless devices 222, 224, 226 report a "leaving CSG" Proximity Indication message to the source access node 202, 204, 206, the controller node 214 may store a corresponding $RSRP_{Macro-j}$ and $RSRP_{CSG-Cell-i}$ level of the source 202, 204, 206 and target 208, 210, 212 access nodes and a $EGCI_{target}$ of the target access node 208, 210, 212 in the communication network 218. Based on the stored $RSRP_{Macro-j}$ and $RSRP_{CSG-Cell-i}$ levels, $EGCI_{source}$, and $EGCI_{target}$, the network can estimate the proximity of the target access node 208, 210, 212 to the source access node 202, 204, 206.

The network can also collect $RSRP_{Macro-j}$ levels of the non-selected wireless device 228 current frequency that it reports to the source access node 202, 204, 206 when the non-selected wireless device 228 is in the RRC Connected mode. When the non-selected wireless device 228 reports an $RSRP_{Macro-j}$ level that is similar to an $RSRP_{Macro-j}$ and/or $RSRP_{CSG-Cell-i}$ level reported by the selected wireless devices 222, 224, 226, the network periodically monitors quality indicators, e.g., deep packet inspection (DPI), for the non-selected wireless device 228.

In an exemplary embodiment, the network uses the $RSRP_{Macro-j}$ and $RSRP_{CSG-Cell-i}$ levels, $EGCI_{source}$, $EGCI_{target}$, and the quality indicators of the non-selected wireless device 228 to estimate the impact of the target access node 208, 210, 212 interference on the non-selected wireless device 228 connected to the source access node 202, 204, 206 at specific locations. For example, if a non-selected wireless device reports an $RSRP_{Macro-j}$ level that is similar to the $RSRP_{Macro-j}$ and/or $RSRP_{CSG-Cell-i}$ levels reported by the selected wireless devices 222, 224, 226, the quality indicators for the non-selected wireless device 228 are collected and correlated against the stored $RSRP_{Macro-j}$ and/or $RSRP_{CSG-Cell-i}$ levels reported by the selected wireless devices 222, 224, 226. The impact of the $RSRP_{Macro-j}$ and/or $RSRP_{CSG-Cell-i}$ levels reported by the selected wireless devices 222, 224, 226 on the non-selected wireless device 228 is measured by a change in the quality indicators of the non-selected wireless device 228 as a function of the $RSRP_{Macro-j}$ reported by the non-selected wireless device 228. The network will continue to monitor the $RSRP_{Macro-j}$ and/or $RSRP_{CSG-Cell-i}$ levels, the $EGCI_{source}$, and $EGCI_{target}$, reported by the selected wireless devices 222, 224, 226, the $RSRP_{Macro-j}$ reported by the non-selected wireless device 228, and the quality indicators of the non-selected wireless device 228 and estimate the impact of intra-frequency interference on the non-selected wireless device 228 multiple times until a solid model is created. The model may be used to adjust an inter-frequency measurement procedure for the source access node 202, 204, 206 in proximity to the target access node 208, 210, 212. The model may be fine-tuned ξ by repeating the monitoring and estimating steps as noted above.

Note that it is assumed that the $RSRP_{Macro-j}$ reported by the non-selected wireless device 228 becomes weaker as the non-selected wireless device 228 moves further into a coverage area 256 of the target access node 208, 210, 212. Large target access node 208, 210, 212 intra-frequency interference can be identified by an abrupt drop in the quality indicators of the non-selected wireless device 228.

At step 504, a network node can initiate an inter-frequency measurement procedure. For example, in an exemplary embodiment, the network can use the estimated impact to adjust an inter-frequency measurement report for the non-selected wireless device 228 and instruct the non-selected wireless device 228 to operate on a different frequency band. The source access node 202 can proceed with handover of the non-selected wireless device 228 to a different frequency band.

In another exemplary embodiment, once handover of the non-selected wireless device 228 is completed, the network can monitor handover performance for the non-selected wireless device 228 via the controller node 214.

Figure 6:
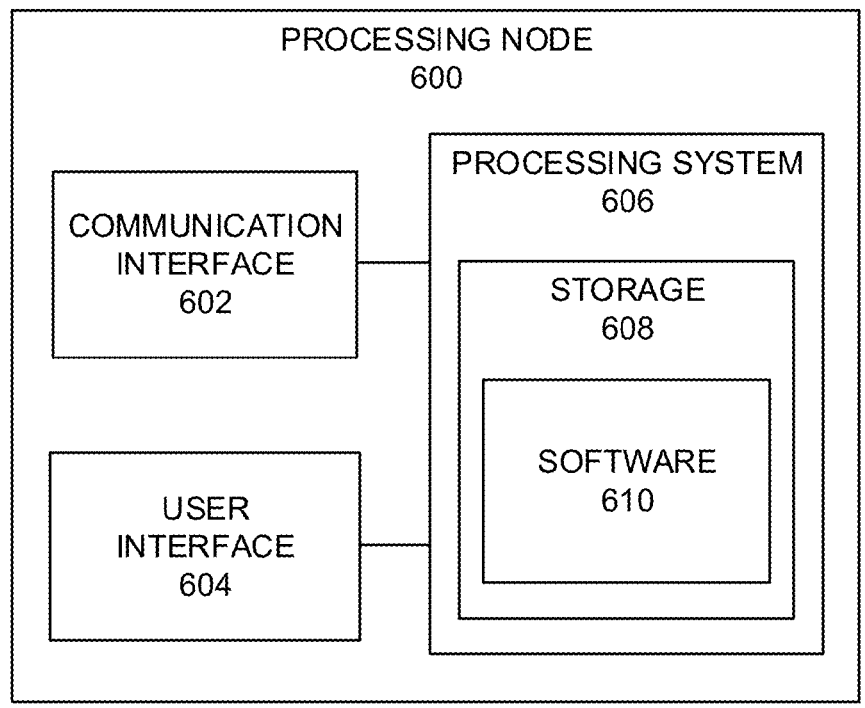
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 106, 108, 202, 204, 206, 208, 210, 212, gateway node 216 and controller node 214. Processing node 600 can also be an adjunct or component of a network element, such as an element of access nodes 106, 108, 202, 204, 206, 208, 210, 212, gateway node 216, and controller node 214. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for implementing an inter-frequency measurement procedure, the method comprising:
    selecting a group of wireless devices based on a selection criteria and receiving from the selected group of wireless devices a first parameter value associated with a first access node;
    estimating proximity of a second access node to the first access node based on the received first parameter value;
    receiving from a non-selected wireless device a second parameter value associated with the first access node that is within a level of the first parameter value and monitoring quality indicators for the non-selected wireless device;
    determining a relationship between the received first parameter value and the quality indicators; and
    initiating an inter-frequency measurement procedure based on the determined relationship.

2. The method of claim 1, wherein the selection criteria is a valid subscription to the second access node.

3. The method of claim 1, wherein the first access node configures the selected group of wireless devices with closed access mode proximity detection as a measurement type.

4. The method of claim 1, wherein the first parameter value is measurement and reporting information of the first access node and the second access node.

5. The method of claim 4, wherein the measurement and reporting information includes whether the selected group of wireless devices are entering or leaving a corresponding frequency associated with the first access node and/or second access node.

6. The method of claim 1, wherein a cell global identity and a signal power level of the first access node is stored at the source access node.

7. The method of claim 6, wherein a cell global identity and a signal power level of the second access node is stored at the source access node.

8. The method of claim 7, the second parameter value is a signal power level of a current frequency of the non-selected wireless device.

9. The method of claim 8, wherein a fine-tuning factor is applied to determined relationship.

10. The method of claim 1, wherein the second access node is deployed within a coverage area of the first access node.

11. A system for implementing an inter-frequency measurement procedure, the system comprising:
    a first access node and a controller, the controller configured to:
    select a group of wireless devices based on a selection criteria and received from the selected group of wireless devices a first parameter value associated with a first access node;
    estimate proximity of a second access node to the first access node based on the received first parameter value;
    receive from a non-selected wireless device a second parameter value associated with the first access node that is within a level of the first parameter value and monitor quality indicators for the non-selected wireless device;
    determine a relationship between the received first parameter value and the quality indicators; and
    initiate an inter-frequency measurement procedure based on the determined relationship.

12. The system of claim 11, wherein the selection criteria is a valid subscription to the second access node.

13. The system of claim 11, wherein the controller node is configured to provide the group of selected wireless devices with closed access mode proximity detection as a measurement type.

14. The system of claim 11, wherein the non-selected wireless device does not have a valid subscription to the second access node.

15. The system of claim 13, wherein the controller node is configured to detect a location of the non-selected wireless device based on a reference signal received power and cell global identity of the first access node and the second access node reported by the group of selected wireless devices and received at the first access node.

16. The system of claim 13, wherein the source access node is notified when the group of selected wireless devices enters or leaves a corresponding frequency associated with the first access node and/or the second access node.

17. The system of claim 11, wherein the first parameter value is a signal power level of the source access node and target access node reported by the group of selected wireless devices.

18. The system of claim 17, wherein the second parameter value is a signal power level of a current frequency of the non-selected wireless device.

* * * * *